Nov. 7, 1944.   H. SWANSON   2,362,172

VEHICLE HEADLIGHT WITH INTEGRAL FULL-BEAM ELECTRIC LAMPS

Filed March 25, 1943   2 Sheets-Sheet 1

Witnesses:
Florence Hilston
Gustave W. Hilston

Inventor
Harold Swanson

Nov. 7, 1944.  H. SWANSON  2,362,172
VEHICLE HEADLIGHT WITH INTEGRAL FULL-BEAM ELECTRIC LAMPS
Filed March 25, 1943  2 Sheets-Sheet 2
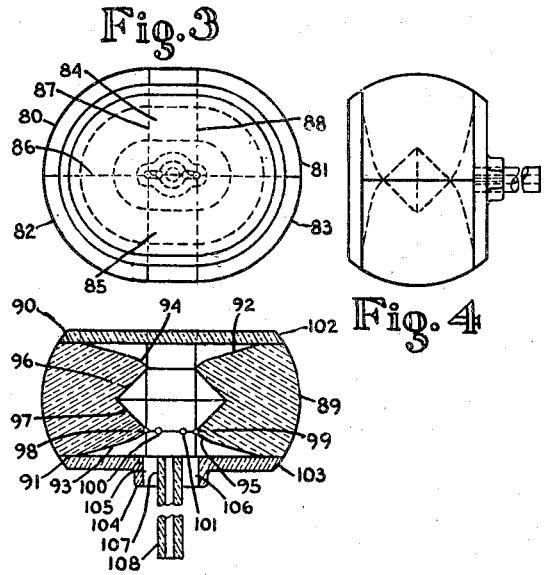
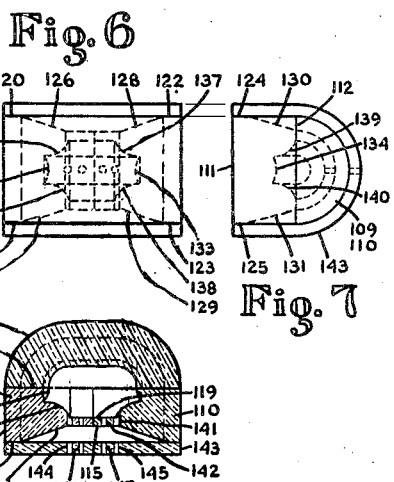
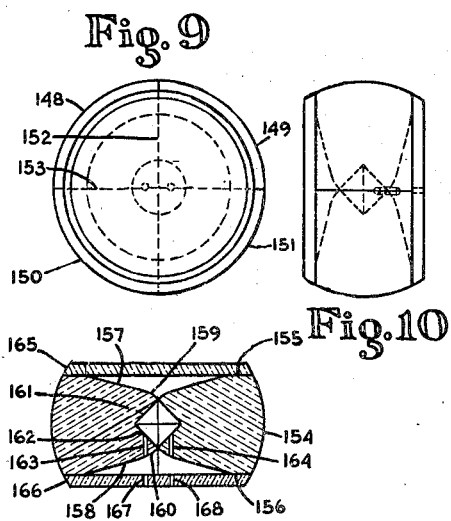
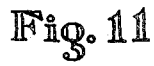
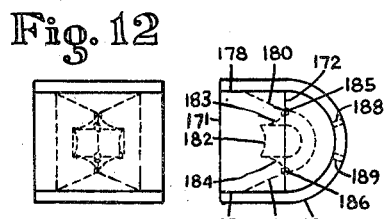
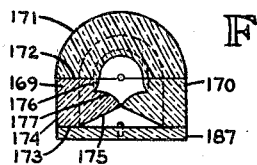
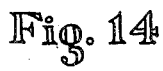
Witnesses:
Florence Hilston
Gustave W. Hilston
Inventor
Harold Swanson Patented Nov. 7, 1944

2,362,172

UNITED STATES PATENT OFFICE 2,362,172

VEHICLE HEADLIGHT WITH INTEGRAL FULL-BEAM ELECTRIC LAMPS

Harold Swanson, Brownhelm Township, Lorain County, Ohio

Application March 25, 1943, Serial No. 480,421

3 Claims. (Cl. 176—34)

This invention relates to improvements to increase the effective illumination produced by vehicle headlights and similar articles, but more particularly those electric lamps used in automobile headlights which uses focusing type electric lamps.

One object of this invention is to show a practical means of constructing a headlight electric lamp with optical elements that completely surround the lamp's light source and gathering such light produced into a concentrated beam which is projected by means of a headlight lens in a receptacle to the roadway for such vehicle.

A further object is that this application, together with my copending applications Serial Numbers 480,420, 480,422, 480,423, 480,424 and 480,425, filed March 25, 1943, is a continuation of my full-beam electric lamp application Serial Number 402,778, filed July 17, 1941, in which nearly an exact duplicated description of these inventions are originally presented. The feature which is generic to all these inventions is the full-beam refracting element and its adaptation in construction, and operation to gather the light in nearly all directions from a light source into a concentrated beam, as applied to electric lamps; however on account of the present Patent Office regulations restricting the limitations presented in a single application, it was necessary to segregate these applications.

A further object is to show that certain improvements set forth in my original application Serial Number 744,598, filed September 18, 1934, and subsequently continued through the following: Patent Number 2,097,679, patented November 2, 1937; Patent Number 2,137,732, patented November 22, 1938; Patent Number 2,154,542, patented April 18, 1939; Patent Number 2,222,093, patented November 19, 1940, are adaptable to make vehicle headlight full-beam electric lamps and similar articles.

A further object is that this invention is a continuation of my earlier inventions mentioned in the preceding paragraph, in respect to where any improvements or subject matter of my earlier inventions can be used to advantage with the improvements of this invention, particularly the use of the hollow metal wires and their many features which are described in the previously mentional applications or patents and in this application.

A further object is that many features or improvements used in connection with my copending applications, previously referred to, can be used to advantage with this application, particularly the full-beam refracting elements and the many cross combinations possible by their substitution herein.

Other objects of this invention will appear more fully described and illustrated hereinafter.

Fig. 3 to Fig. 14 are elevational and sectional views of the full-beam refracting elements for a vehicle headlight full-beam electric lamp.

Figure 1:
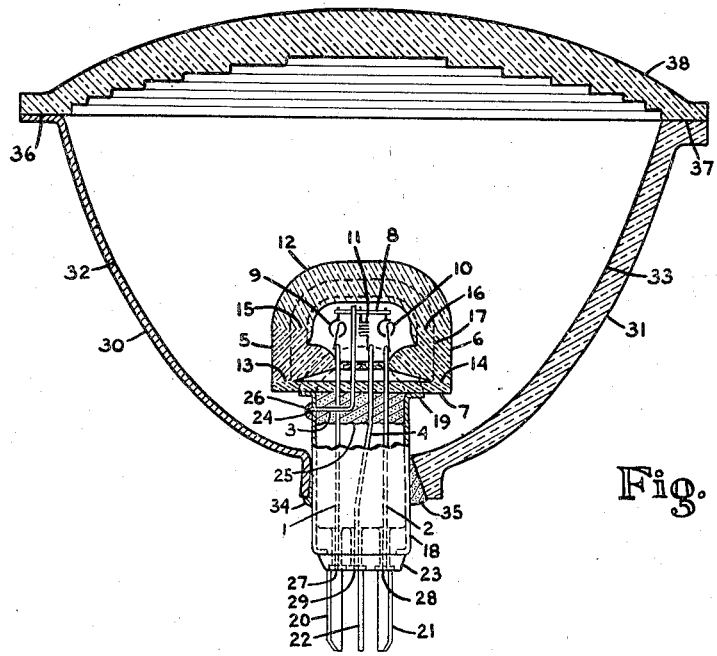
Fig. 1 and Fig. 2 are sectional views of full-beam electric lamps integrally built into vehicle headlights for automobiles.

Referring to Fig. 1 which is a sectional view of a full-beam electric lamp integrally built into an automobile headlight; having four hollow metal wires 1, 2, 3, and 4 being the lead-in wires with notched openings cut through the walls near the inner ends for exhausting or gas filling operations which are inserted through holes in the walls of two quarter full-beam refracting elements 5 and 6 being made from heat resisting glass, and holes in a U formed glass receptacle 7 (see Fig. 6 to Fig. 8 for details); a lead-in wire terminal 8 is spot-welded to the inner end of lead-in wire 3, and the ends of three coiled electric lamp filaments 9 10, and 11, each designed respectively for, a near or passing beam, a far or rural driving beam, and a parking or twilight driving beam, which are positioned and spot-welded together with the inner ends of the other lead-in wires 1, 2, and 4, and the terminal 8 while held in a suitable mounting fixture that allows the refracting elements 5 and 6 and the receptacle 7 to be slipped along the lead-in wires 1, 2, 3, and 4 far enough for mounting operations; a half full-beam refracting element 12 (see Fig. 6 to Fig. 8 for details) being made from heat resisting glass, together with the refracting elements 5 and 6, and the receptacle 7, are all coated with a film of suitable glass fusing material on their junction surfaces at 13, 14, 15, 16, and all around the edge up to the line 17 both front and rear, and then all hermetically sealed together by glass fusion, enclosing the filaments 9, 10, and 11; after positioning the filaments 9, 10, and 11, a mass of suitable glass fusing material is coated around the lead-in wires 1, 2, 3, and 4 at the outer junction surfaces of the receptacle 7, and then the lead-in wires are hermetically sealed in place by glass fusion; a special electric lamp base having a brass body 18, with the flange end at 19 that form fits the receptacle 7, and three brass end contacts 20, 21, and 22 whose inner ends are moulded into the end insulation plug 23, and a lead-in wire hole or notched groove at 24, is coated on the inside with a suitable basing cement 25 and cemented to the receptacle 7 as shown, with the lead-in wires 1, 2, 3, and 4 threaded through holes in the end contacts 20 21, and 22, and hole at 24; then the lamp is exhausted to a vacuum or exhausted and filled with an inert gas, at either low or high pressures, up to a safe working pressure, through the hollow metal wires 1, 2, 3, and 4 which are swaged or flattened and cut off to form the preliminary seals and later the final seals at 26, 27, 28, and 29 are made by soldering the ends air tight as they are soldered to the lamp base body 18 and contacts 20, 21, and 22; an automobile headlight reflector either metal 30 or glass 31 (each is shown by half section for convenience of illustration) of circular cross-section as shown, and having the inside parabolic surface 32 (metal) or 33 (glass) coated with silver, or other suitable metal, to give a mirrored surface which is later lacquered for protection if necessary; the lamp is inserted into the center hole of the reflector 30 (metal) 31 (glass), then positioned and soldered or cemented in place with solder or a suitable cement 34 or 35 respectively; the upper flanged brim of the reflector 30 (metal) or 31 (glass) is coated with a film of suitable cement or glass fusing material all around at 36 or 37 and (or without coating if desired) hermetically sealed by glass fusion, or cemented with the glass headlight lens 38 at 36 or 37 respectively.

Figure 2:
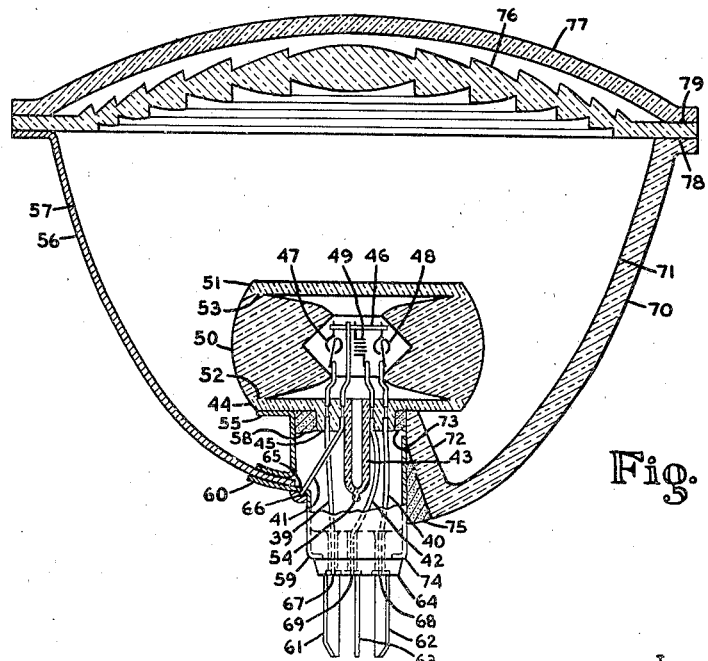

Referring to Fig. 2 which is a sectional view of a full-beam electric lamp integrally built into an automobile headlight; having four regular three-piece electric lamp lead-in wires 39, 40, 41, and 42, a glass exhaust tube 43, and the lower glass plate or flange 44 (see Fig. 3 to Fig. 5 for details) made with a tubular neck 45, are all hermetically sealed together by glass fusion, with heat applied all around the neck 45 (lead-in wires 39 and 40 can also be sealed against the exhaust tube 43 spaced a little to rear or in front of lead-in wires 41 and 42 respectively, or all lead-in wires equally spaced around the exhaust tube, with the neck 45 made smaller in diameter); a lead-in wire terminal 46 is spot-welded to the inner end of lead-in wire 41, and the ends of three coiled electric lamp filaments 47, 48, and 49 each designed respectively for, a near or passing beam, a far or rural driving beam, and a parking or twilight driving beam, which are positioned and spot-welded together with the inner ends of the other lead-in wires 39, 40, and 42, and the terminal 46; two halves of the full-beam refracting element 50 (see Fig. 3 to Fig. 5 for details) being made from heat resisting glass (only the rear half of element 50 is shown here) are coated on their junction surfaces and also all around the edges of the upper glass plate 51 and the lower plate 44 at 52 and 53 with a film of glass fusing material and then all hermetically sealed together by glass fusion, enclosing the filaments 47, 48, and 49; then the lamp is exhausted to a vacuum, or exhausted and filled with an inert gas, at low pressures through the contracted glass exhaust tube 43 which is heated and tipped off at 54. For convenience of illustration here, I have shown a metal reflector mounting, and a glass reflector mounting, each by half section. In the metal reflector mounting, a metal adaptor 55 is spot-welded or soldered to an automobile headlight metal reflector 56, both of circular cross-section as shown, and having the inside parabolic surface 57 coated with silver, or other suitable metal, to give a mirrored surface which is lacquered for protection if necessary; the lamp is positioned and cemented to the adaptor 55 with a suitable cement 58; a special electric lamp base having a brass body 59, with a formed flange 60 fitting the reflector 56, and three brass end contacts 61, 62, and 63 whose inner ends are moulded into the end insulation plug 64, and a lead-in wire hole or notched groove at 65, is positioned and spot-welded or soldered to the reflector 56 as shown, with the lead-in wires 39, 40, 41, and 42 threaded through holes in the end contacts 61, 62, and 63, and hole in body 59 at 65, and later soldered thereto at 66, 67, 68, and 69. In the glass reflector mounting, an automobile headlight glass reflector 70 of circular cross-section as shown, and having the inner parabolic surface 71 coated with silver, or other suitable metal, to give a mirrored surface which is lacquered for protection if necessary; the lamp is positioned and cemented to the hub 72 with a suitable cement 73; a special electric lamp base having a brass body 74, and being otherwise the same as the preceding base for the metal reflector, with contacts 61, 62, and 63, plug 64, hole at 65, and lead-in wires 39, 40, 41, and 42 soldered at 66, 67, 68, and 69, is positioned and cemented in place with a suitable cement 75. A glass double prismatic lens 76, and a glass cover 77, both of circular cross-section as shown, are coated all around their flanged surfaces at 78 and 79 with a film of suitable cement or glass fusing material and (or without coating if desired) hermetically sealed by glass fusion, or cemented with the reflector 56 (metal) or 70 (glass) at 78 and 79.

In Fig. 1 and Fig. 2, the reflector, the adaptor, and the base, can be cemented or otherwise assembled together with each part in its proper position to make a unit, and then the lamp is independently positioned within the unit, and cemented in place, making the finished headlight exactly the same as though it was made as previously described.

In Fig. 1 or Fig. 2 the headlight full-beam electric lamp can be made with a beveled reflecting surface which would eliminate the parabolic reflecting surface entirely, then the parts 30, 31, 56 or 70 could be made to any convenient shape to be just a dust tight enclosing shell upon which the lamp and base are mounted.

In Fig. 3 to Fig. 14, the details are generally symmetrical about their center lines, and for convenience, so as not to crowd the numbers, I have shown some of the numbers designating details of either half indiscriminately. Generally the numbers are designated only in one place; however in several cases the same number appears in two views for easier identification.

In Fig. 3 to Fig. 14, each part is shown by three views in third-angle orthographic projection, a plan or top elevation, a side elevation, and the lower one being a center sectional view.

Referring to Fig. 3 to Fig. 5 collectively which shows the refracting elements and connecting parts for a headlight full-beam electric lamp; having four quarter full-beam refracting elements 80, 81, 82, and 83, and two spacer refracting elements 84 and 85, all being made from heat resisting glass and fitting together on their center line junction surfaces at 86, 87, and 88; each element 80, 81, 82, or 83 having a quadrant body which is crowned around the outer surface at 89 to form the shape of a convex lens cross-section; each element 80, 81, 82, or 83 having upper and lower parallel flat rims at 90 and 91, and tapering inward to form quadrant cones at 92 and 93 with curves at 94 and 95 which approximates parabolic light reflecting surfaces at 94 and 95 and then curving into 135° (approximate) prism light reflecting surfaces at 92 and 93 for light-rays radiating from the center line of the light source chamber; each element 80, 81, 82, or 83 having a light chamber which is formed by quadrant double cone surfaces at 96 and 97; each element 84 or 85 having exactly the same cross-sectional shape as elements 80, 81, 82, and 83 except being made straight with parallel ends instead of quadrant shaped; lead-in wire grooves are formed at 98, 99, 100, and 101; two glass oval connecting plates 102 and 103 fitting elements 80, 81, 82, 83, 84, and 85 on their respective rims at 90 and 91; the lower plate 103 having an elongated hub or neck at 104 with lead-in wire slots at 105 and 106 extending from a hole at 107 for the glass exhaust tube 108. Elements 80, 81, 82, and 83 are constructed around the polar axis.

Referring to Fig. 6 to Fig. 8 collectively which shows the refracting elements and receptacle for a headlight full-beam electric lamp; having two quarter full-beam refracting elements 109 and 110, and an elongated half full-beam refracting element 111, all being made from heat resisting glass and fitting together on their center line junction surfaces at 112; each element 109 or 110 having a semi-cylindrical body at 113 with one end made approximately square at 114 and the other end made into a semi-tube at 115 which enlarges to a semi-cone frustum whose flanks form a 120° (approximate) prism light reflecting surface at 116 for light-rays radiating from the center line of the light source chamber; each element 109 or 110 having its outer surface at 115 coated with silver or other suitable metal to give a mirrored surface; each element 109 or 110 having a light source chamber which is formed into a small half convex lens surface at 117 with the other inner surfaces at 118 formed into a semi-cone frustum whose flanks are shaped to a convex lens cross-section that adjoins the inside surface at 119 of the semi-tube; element 111 being made elongated in one piece from quadrant and straight sections of uniform cross-sectional shape, having an elongated semi-cylindrical body with upper and lower parallel flat rims at 120, 121, 122, 123, 124, and 125 and tapering inward to elongated semi-cones whose flanks form 120° (approximate) prism light reflecting surfaces at 126, 127, 128, 129, 130, and 131 for light-rays radiating from the center line of the light source chamber; element 111 having a light source chamber which is formed by elongated semi-circular ring surfaces at 132, 133, and 134 shaped to a convex lens cross-section, with elongated semi-cone surfaces at 135, 136, 137, 138, 139, and 140 whose flanks are shaped to a convex lens cross-section; lead-in wire holes at 141 and 142 are formed in each element 109 and 110; a U formed glass receptacle 143 fitting the elements 109 and 110 around each body at 113, and element 111 around the rims at 120, 121, 122, 123, 124, and 125; lead-in wire holes at 144, 145, 146, and 147 are formed in the receptacle 143. Elements 109 and 110 are constructed around the equatorial axis, while element 111 is constructed around the polar axis.

Referring to Fig. 9 to Fig. 11 collectively which shows the refracting elements and connecting plates for a headlight full-beam electric lamp; having four quarter full-beam refracting elements 148, 149, 150, and 151 being made from heat resisting glass and fitting together on their center line junction surfaces at 152 and 153; each element 148, 149, 150, or 151 having a quadrant body which is crowned around the outer surface at 154 to form the shape of a convex lens cross-section; each element 148, 149, 150, or 151 having upper and lower parallel flat rims at 155 and 156 and tapering inward to form quadrant cone frustums at 157 and 158 with curves at 159 and 160 which approximates parabolic light reflecting surfaces at 159 and 160, and then curving into 135° (approximate) prism light reflecting surfaces at 157 and 158 for light-rays radiating from the center of the light source chamber; each element 148, 149, 150, or 151 having a light source chamber which is formed by quadrant double cone surfaces at 161 and 162; lead-in wire grooves are formed at 163 and 164; two glass circular connecting plates 165 and 166 fitting the elements 148, 149, 150, and 151 on their respective rims at 155 and 156; lead-in wire holes at 167 and 168 are formed in the lower plate 166. Elements 148, 149, 150, and 151 are constructed around the polar axis.

Referring to Fig. 12 to Fig. 14 collectively which shows the refracting elements and receptacle for a headlight full-beam electric lamp; having two quarter full-beam refracting elements 169 and 170, and a half full-beam refracting element 171, all being made from heat resisting glass and fitting together on their center line junction surfaces at 172; each element 169 or 170 having a semi-cylindrical body at 173 with one end made approximately square at 174 and the other end made into a semi-cone frustrum whose flanks form a 120° (approximate) prism light reflecting surface at 175 for light-rays radiating from the center of the light source chamber; the inner end of each element 169 or 170 is recessed into a light source chamber with a small half convex lens surface at 176 and the other surface at 177 being formed into a semi-cone frustum whose flanks are shaped to a convex lens cross-section; element 171 having a semi-cylindrical body with upper and lower parallel flat rims at 178 and 179 and tapering inward to two semi-cones whose flanks form 120° (approximate) prism light reflecting surfaces at 180 and 181 for light-rays radiating from the center of the light source chamber; element 171 having a light source chamber which is formed by a semi-circular ring surface at 182 shaped to a convex lens cross-section, with two semi-cone surfaces at 183 and 184 whose flanks are shaped to a convex lens cross-section; lead-in wire grooves are formed at 185 and 186; a U formed glass receptacle 187 fitting the elements 169 and 170 around each body at 173, and element 171 around the rims 178 and 179; lead-in wire holes at 188 and 189 are formed in the receptacle 187. Elements 169 and 170 are constructed around the equatorial axis, while element 171 is constructed around the polar axis.

While I have not shown light propagation diagrams of the full-beam refracting elements shown and described herein, yet diagrams of them could be easily approximated after studying the diagrams in my copending applications, previously referred to, Serial Numbers 480,423, 480,424 and 480,425, with the full-beam refracting elements that they represent.

In Fig. 6 to Fig. 8, and in Fig. 12 to Fig. 14, the full-beam refracting elements are composed by matching elements of different design or construction, and it is evident that many more combinations can be similarly made by matching any two inner full-beam refracting elements or any two outer full-beam refracting elements together which are shown or described in any of my copending applications Serial Numbers 480,420, 480,422, 480,423, 480,424 and 480,425, which feature shall be one of the improvements and a furthere object of this invention.

In Fig. 3 to Fig. 8, the full-beam refracting elements are for the lamps in Fig. 1 and Fig. 2, which have several filaments in each, while the elements in Fig. 9 to Fig. 14 are designed for lamps having only one filament therein, and being otherwise the same as the lamps in Fig. 1 and Fig. 2.

When it is practical to do so, the filaments of the lamps shown or described herein can be replaced with a small pin-head electric lamp or any of the small electric lamps shown or described in the previously mentioned patents (2,097,679, 2,137,732, 2,154,542, and 2,222,093).

Whenever the words 'refracting element" or "full-beam refracting element" or "outer full-beam refracting element" or "inner full-beam refracting element" or the plural "elements" in place of "element" with said words, are used herein, they are intended to mean the refracting elements shown and described herein or in my copending applications Serial Numbers 480,420, 480,422, 480,423, 480,424 and 480,425, or any full-beam refracting element which is made with any improvement or feature described herein or therein.

Whenever the words "high pressure gas" or "hollow metal wire" or "hermetically sealed" or "final seal" or "pin-head electric lamp" are referred to herein, they are intended to have the same meaning as described in one or more of the previously mentioned patents (2,097,679, 2,137,732, 2,154,542, 2,222,093) from which this invention is a continuation.

Whenever the words "convex lens" or "convex lens shape" or "convex lens cross-section" are used herein to describe a curve or surface, they are intended to mean that such curve or surface has a form which resembles a convex lens or a convex lens curve; or any type of lens curve or surface which is corrected optically for spherical and chromatic aberration; or any type of curve or surface which will refract light-rays.

In view of the preceding description and the drawings, it is obvious that the improvements of this invention can be used to make many more vehicle headlights with integral full-beam electric lamps other than those shown and described herein; therefore in anticipation of the manufacture of such lamps, it is a further object of this invention to extend the claims to include any electric lamp which uses one or more of the improvements described or claimed herein.

I am aware that prior to this invention, automobile headlights have been made, each of which have an electric lamp, of multiple filament type, a parabolic reflector, and a headlight lens, all hermetically sealed together forming an integral unit; however none of those headlights were made with a full-beam electric lamp therein as described herein, and it is my intention that the improvements described or claimed herein shall extend those improvements used heretofore; for example apart from the full-beam electric lamp feature the improvement of using a single or double prismatic lens 76 and cover 77, in Fig. 2, is a novel feature having certain advantages for light beam projection with automobiles or other vehicle headlights.

I claim:

1. A vehicle headlight with an integral electric lamp, consisting of, a receptacle being a reflector with a headlight lens and cover of transparent material attached thereto, said receptacle having an electric lamp enclosed therein with a lamp base positioned in axial alignment extending therefrom, said lamp having a light source with electric leads extending therefrom to said lamp base, said lamp having full-beam refracting elements for gathering light from said light source and projecting the same to said reflector thence through said lens in predetermined directions.

2. A vehicle headlight, consisting of, a full-beam electric lamp mounted in axial alignment within a receptacle, said receptacle being a reflector with a headlight lens cover attached thereto, said reflector having an electric lamp base extending therefrom and positioned in axial alignment therewith connected to said lamp therein, said lamp having a light source with electric leads connecting the same with said lamp base, said lamp having an inclosure being a light source chamber for said light source, said light source chamber formed with lens and prism sections into a full-beam refracting element, said element being in several pieces to position said leads and light source therein, said element arranged around said light source to gather light from nearly all directions therefrom and project the same to said reflector and said headlight lens thence in predetermined directions.

3. A vehicle headlight, consisting of, a receptacle having a full-beam electric lamp mounted in axial alignment therein, said receptacle having a reflector body with a cover of light transmitting material attached on the same to form an enclosure, said enclosure housing a full-beam electric lamp having a light source with electric leads connected thereto within a light source chamber composed of optical sections, said receptacle having an electric lamp base extending therefrom being connected to said lamp with said leads, said lamp base mounted in axial alignment within said receptacle, said optical sections arranged around said light source to gather light from the same and give a maximum light value projected to said reflector thence in predetermined directions.

HAROLD SWANSON.